(12) United States Patent
Nabata et al.

(10) Patent No.: US 6,302,934 B1
(45) Date of Patent: Oct. 16, 2001

(54) FILTER MEDIUM FOR FILTERS

(75) Inventors: Norikane Nabata; Yozo Nagai; Eizo Kawano; Takuya Maeoka, all of Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/437,099

(22) Filed: Nov. 9, 1999

(30) Foreign Application Priority Data

Nov. 30, 1998 (JP) .................................................. 10-340648
Aug. 6, 1999 (JP) .................................................. 11-223709

(51) Int. Cl.⁷ .................................................. B01D 46/10
(52) U.S. Cl. .................................. 55/486; 55/524; 55/528; 96/13
(58) Field of Search ............................ 96/12–14; 55/486, 55/521, 524, 528

(56) References Cited

U.S. PATENT DOCUMENTS

| | | | |
|---|---|---|---|
| 4,816,328 | * 3/1989 | Saville et al. | 55/486 X |
| 4,877,433 | * 10/1989 | Oshitari | 55/486 |
| 5,019,140 | * 5/1991 | Bowser et al. | 55/486 X |
| 5,096,473 | * 3/1992 | Sassa et al. | 55/486 X |
| 5,108,474 | * 4/1992 | Riedy et al. | 55/486 X |
| 5,417,743 | * 5/1995 | Dauber | 96/13 |
| 5,507,847 | * 4/1996 | George et al. | 55/486 |
| 5,538,545 | * 7/1996 | Dauber et al. | 55/385.6 X |
| 5,593,482 | * 1/1997 | Dauber et al. | 55/385.6 X |
| 5,830,261 | * 11/1998 | Hamasaki et al. | 96/13 X |
| 5,876,487 | * 3/1999 | Dahlgren et al. | 55/385.6 X |
| 5,888,275 | * 3/1999 | Hamasaki et al. | 96/13 X |
| 6,030,428 | * 2/2000 | Ishino et al. | 96/13 X |
| 6,110,249 | * 8/2000 | Medcalf et al. | 55/528 X |
| 6,149,702 | * 11/2000 | Kawano et al. | 55/521 X |

FOREIGN PATENT DOCUMENTS

| | | |
|---|---|---|
| 0 633 053 A1 | 1/1995 | (EP) . |
| 0 808 648 A1 | 11/1997 | (EP) . |
| 10-30031 | 2/1998 | (JP) . |
| WO 94/16802 | 8/1994 | (WO) . |

OTHER PUBLICATIONS

Patent Abstract of Japan, vol. 1995, No. 10, 07–171,318 (07/11/95).

* cited by examiner

*Primary Examiner*—Robert H. Spitzer
(74) *Attorney, Agent, or Firm*—Sughrue, Mion, Zinn, Macpeak & Seas, PLLC

(57) ABSTRACT

A filter medium for filters wherein the evolution of organic gases and dusting from a reinforcing member are depressed and thus the excellent characteristics inherent to a porous polytetrafluoroethylene membrane as a collection layer are fully achieved. The filter medium (1) for filters comprises a porous polytetrafluoroethylene membrane (2) and a porous ultrahigh-molecular weight polyolefin membrane (3) as a reinforcing member for the filter medium.

3 Claims, 2 Drawing Sheets

FILTER MEDIUM FOR FILTERS

FIELD OF THE INVENTION

This invention relates to filter media for filters with the use of porous polytetrafluoroethylene (hereinafter referred to as "PTFE" for simplicity) membranes. More particularly, it relates to filtering media for filters with the use of porous PTFE membranes which are appropriately used for collecting particles suspended in the atmosphere in clean rooms used in the fields of semiconductors, drugs, etc. It also relates to filtering media for filters (for example, filtering media for vent filters) with the use of porous PTFE membranes which are appropriately used for collecting dust invading into hard disks or dust formed in hard disks.

BACKGROUND OF THE INVENTION

As filter medium for filters, there have been frequently used those produced by blending glass fibers with binders and processing into a paper. However, these filter media suffer from some problems, for example, self-dusting due to fine fibers contained therein, self-dusting at bending process and dusting caused by deterioration due to contact with chemicals such as hydrofluoric acid.

In recent years, filter media with the use of porous PTFE membranes, which are clean materials and highly resistant to chemicals, have attracted attention in the field of air filter technology. A porous PTFE membrane can be produced by, for example, molding PTFE into a sheet and then stretching the sheet to thereby make it porous (see, for example, WO94/16802, JP-A-10-30031; the term "JP-A" as used herein means an "unexamined published Japanese patent application"). Because of having a low pressure drop and a high collection efficiency, a porous PTFE membrane produced via the pore-forming step as described above has an excellent collection performance. Therefore, filter media with the use of porous PTFE membranes are suitable particularly for achieving a highly clean environment required in clean rooms used in the fields of semiconductors, etc.

However, an adequate rigidity for filter media can be hardly established by using a porous PTFE membrane alone. Therefore, in many cases, a porous PTFE membrane is bonded to an air-permeable porous material or laminated thereon to give a filter medium for filters. As the air-permeable material serving as the reinforcing member, use is generally made of nonwoven fabrics.

An air filter unit obtained by pleating a laminate consisting of a nonwoven fabric and a porous PTFE membrane can actually establish a remarkably excellent performance, i.e., collecting particles (0.1 μm) at an efficiency of 99.999999% or above. Namely, filter media for filters with the use of porous PTFE membranes have characteristics fundamentally appropriate for improving a high environmental cleanness required in clean rooms, etc.

However, these conventional filter media for filters consisting of a nonwoven fabric and a porous PTFE membrane suffer from problems of pollution caused by self-dusting from the nonwoven fabric and pollution with organic gases evolved from the nonwoven fabric. In particular, it is pointed out that organic gases (for example, dioctyl phthalate, 2,6-di-tert-butyl-p-cresol and dibutyl phthalate, hereinafter referred to respectively as "DOP", "BHT" and "DBR" for simplicity) evolved from the conventional filter media exert unfavorable effects on products in the field of manufacturing semiconductors.

SUMMARY OF THE INVENTION

An object of the present invention is to overcome the above-described problems by taking advantage of the characteristics inherent to porous PTFE membranes to thereby provide a filter medium for filters being capable of establishing improved environmental cleanness.

To achieve the above object, the filter medium of the present invention comprises a laminate comprising a porous ultrahigh-molecular weight polyolefin membrane and a porous polytetrafluoroethylene membrane. Because of having as a reinforcing member a porous ultrahigh-molecular weight polyolefin membrane as a substitute for the nonwoven fabrics employed in the conventional ones, the filter medium according to the present invention can provide improved environmental cleanness compared with the existing ones.

The term "ultrahigh molecular weight" as used herein means having an average molecular weight of at least 500,000, preferably from 500,000 to 16,000,000, when determined by the viscosity method (ASTM D4020).

It is preferable that the filter medium for filters according to the present invention shows a degree of dusting of 500 particles/cf or less in a tear crease-flex test. The present invention makes it possible to provide a high performance filter medium for filters wherein the degree of dusting has been reduced to the level as defined above.

It is also preferable that the filter medium for filters as described above contains 2 μg/g or less (2 ppm or less) of a compound selected from among DOP, BHT and DBP when determined by gas chromatography. The present invention makes it possible to depress the evolution of the organic gases as described above which are harmful particularly in the field of manufacturing semiconductors.

In the filter medium for filters as described above, it is preferable that the porous ultrahigh-molecular weight polyolefin film is a porous film of ultrahigh-molecular weight polyethylene (hereinafter referred to as "UHMWPE" for simplicity). It is still preferable that this UHMWPE has a viscosity-average molecular weight of from 500,000 to 16,000,000. However, use may be made of other ultrahigh-molecular weight polyolefins (for example, ultrahigh-molecular weight polypropylene) as the porous ultrahigh-molecular weight polyolefin membrane.

Also, it is preferable that, in the above-described filter medium for filters, ultrahigh-molecular weight polyolefin particles in the porous ultrahigh-molecular weight polyolefin membrane are bonded to each other so as to form a porous structure provided with the voids among these particles. Such a porous structure can be confirmed by, for example, observing under an electron microscope.

In these drawings, each numerical symbol shows as follows:

| | |
|---|---|
| 1, 10, 20, 30 | Filter medium for filters |
| 2 | Porous PTFE membrane |
| 3 | Porous ultrahigh-molecular weight membrane. |

DETAILED DESCRIPTION OF THE INVENTION

Now preferable embodiments of the present invention will be illustrated by referring to the attached drawings.

Figure 2:
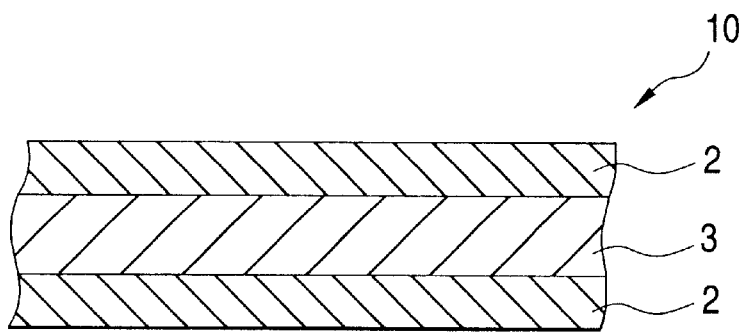
FIG. 2 is a sectional view showing another embodiment of the filter medium for filters according to the present invention.
Figure 3:
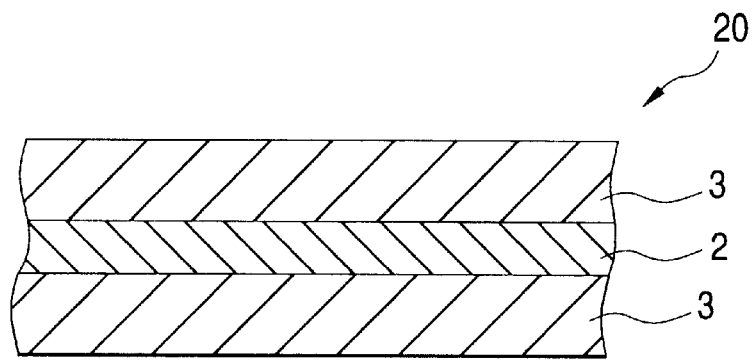
FIG. 3 is a sectional view showing another embodiment of the filter medium for filters according to the present invention.
Figure 4:
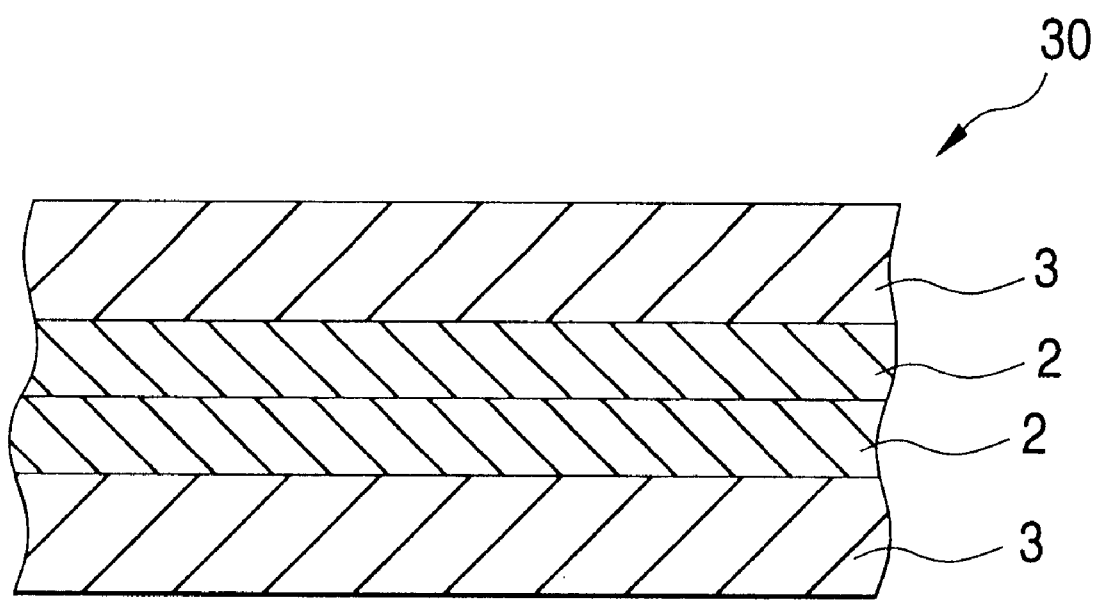
FIG. 4 is a sectional view showing another embodiment of the filter medium for filters according to the present invention.

FIGS. 1 to 4 are each a sectional view showing one example of a constitution of the filter medium for filter according to the present invention. As FIGS. 1 to 4 show, the filter media (1), (10), (20) and (30) for filters according to the present invention each comprises a laminate comprising at least one porous PTFE membrane layer (2) and at least one porous ultrahigh-molecular weight polyolefin membrane layer (3). The porous PTFE membranes (2) and the porous ultrahigh-molecular weight polyolefin membrane (3) are not restricted in the number of the laminated layers. In the filter medium for filters, the porous PTFE membrane (2) and the porous ultrahigh-molecular weight polyolefin membrane (3) may be alternately laminated to each other. Alternatively, either the porous PTFE membrane or the porous ultrahigh-molecular weight polyolefin membrane may be continuously laminated, as FIG. 4 shows.

The porous PTFE membrane (2) is not restricted in average pore size, thickness, porosity, etc. However, it is preferable in general that the average pore size thereof ranges from 0.2 to 2.0 $\mu$m, the thickness thereof ranges from 5 to 50 $\mu$m and the porosity thereof ranges from 60 to 95%. When it is to be used in an environment wherein a high cleanness is required (for example, in a semiconductor clean room), it is preferable that the porous PTFE membrane has a PF (Performance of Filter) value, which indicates the ability to collect dust, exceeding 20. The PF value is calculated in accordance with the following formula:

PF value=[−log (1 −A/100)/B]×100

In the above formula, A means a collection efficiency; and B means a pressure drop expressed in mmH$_2$O.

Such a porous PTFE membrane (2) can be obtained by the conventional production methods disclosed in, for example, the patents cited above (WO 94/16802, JP-A-10-30031), etc. The method employed for producing the porous PTFE membrane is not particularly restricted, so long as the above-described object of the present invention can be achieved thereby.

It is preferable that in the porous UHMWPE membrane, UHMWPE particles are bonded to each other so as to form a porous structure provided with the voids among these particles.

The porous ultrahigh-molecular weight polyolefin membrane can be produced by the conventional production methods disclosed in, for example, JP-B-2589350 (the term "JP-B" as used herein means an "examined Japanese patent application") involving the step of heating an ultrahigh-molecular weight polyolefin powder under elevated pressure by using a mold.

More particularly, an ultrahigh-molecular weight polyolefin powder is filled in a mold and pre-molded at a temperature lower than the melting point of the ultrahigh-molecular weight polyolefin powder. In this pre-molding step, it is appropriate to regulate the pressure to 0.3 to 40 kg/cm$^2$.

Next, the pre-molded article is pressure-molded at a temperature higher than the melting point of the ultrahigh-molecular weight polyolefin powder. In this pressure-molding step, it is appropriate to regulate the pressure to 10 g/cm$^2$ to 5 kg/cm$^2$.

Thus, the ultrahigh-molecular weight polyolefin particles are three-dimensionally bonded to the adjacent ones with each other at the contact sites and thus form a porous structure. (Namely, a molded porous article in the form of a block can be obtained.)

The ultrahigh-molecular weight polyolefin powder has an average particle size preferably ranging from 15 to 300 $\mu$m, still preferably from 20 to 150 $\mu$m.

The molded porous article in the form of a block thus obtained is then cut into a desired thickness with the use of a lathe, etc. The thickness of the porous ultrahigh-molecular weight polyolefin membrane thus obtained is preferably 3000 $\mu$m or less, and more preferably from 30 to 2000 $\mu$m. The porosity of the porous ultrahigh-molecular weight polyolefin membrane is preferably from 35 to 80%.

Subsequently, the porous PTFE membrane is laminated on the porous ultrahigh-molecular weight polyolefin membrane. The lamination may be performed by an arbitrary method without restriction. For example, an adhesive member may be located between these membranes. The porous ultrahigh-molecular weight polyolefin membrane has a high melt viscosity and undergoes little change in the three-dimensional porous structure, thus showing no decrease in air permeability, etc., even though it is heated to a temperature higher than its melting point. It is therefore favorable to heat the porous ultrahigh-molecular weight polyolefin membrane to its melting point or higher (preferably from the melting point to a temperature higher by 30° C. than it) and directly laminate on the porous PTFE membrane. The lamination may be carried out by, for example, superposing the porous PTFE membrane and the porous ultrahigh-molecular weight polyolefin membrane on each other in a definite order and then passing through a pair of rolls having been heated to the melting point of the porous ultrahigh-molecular weight polyolefin membrane or above.

Since the thus obtained filter medium for filters contains as a reinforcing member not a nonwoven fabric but the porous ultrahigh-molecular weight polyolefin membrane, the degree of dusting can be lowered and the amount of the organic gases evolved therefrom can be reduced.

More particularly speaking, the degree of dusting (i.e., the particle concentration measured in the tear crease-flex test as will be described hereinafter) can be lowered to 500 particles/of (cubic feet) or less. With respect to the organic gas evolution, the amount of an organic gas selected from among DOP, BHT and DBP can be reduced to 2 $\mu$g/g or less (2 ppm or less) in the quantitative analysis as will be described hereinafter. It is adequate that DOP, BHP and DBP are evolved each in an amount of 2 $\mu$g/g or less.

To achieve an excellent dust-collecting performance, it is preferable that the above-described filter medium for filters shows a pressure drop of 50 mmH$_2$O or less, when measured by the method as will be described hereinafter.

The present invention will be described in greater detail by reference to the following Examples, but it should be understood that the invention is not construed as being limited thereto.

In these Examples, the amount of gas evolved, degree of dusting, pressure drop and collection efficiency were determined by the following respective methods.

(Quantitative analysis on gas evolution)

A gas was evolved by using a purge & trap type Curie point head space sampler (JHS-100A, manufactured by Japan Analysis Industry) and then introduced into a gas chromatograph (GC-17A, manufactured by Shimadzu Corporation) followed by analysis. The analysis was performed under the following conditions. Conditions for gas evolution with head spacer sampler:

A sample was put into a sample tube and heated to 120° C. (the primary desorption temperature) for 20 minutes while flowing helium gas. Then the gas evolved from the sample was trapped in glass wool at −40° C. (the secondary adsorption temperature). The glass wool was heated to 358° C. (the secondary desorption temperature) for 30 seconds and the gas thus evolved was quantitated by gas chromatography.

Conditions for gas chromatographic analysis:

As a column, use was made of a DB-1 column (manufactured by J & W, diameter: 0.25 mm, height: 30 m). After maintaining at 45° C. for 3 minutes, the column temperature was elevated at a rate of 10° C./min and then maintained at 260° C. for 3 minutes. A flame ionization detector (FID) was employed as a detector, while helium gas was employed as a carrier gas.

(Degree of dusting)

Degree of dusting was determined in a clean bench by the following method.

A sample (150 mm×200 mm) was located about 10 cm above a dust suction inlet (diameter: 30 cm) connected to a particle counter (suction rate: 1 l/min) and subjected to a tear crease-flex test as follows.

First, the sample was torn from around the center of the major side (200 mm) in parallel to the minor side (150 mm) with clean-gloved hands without resort to any cutter. Subsequently, the sample thus torn was creased and flexed for 15 seconds with clean-gloved hands too.

In this tear crease-flex test, the concentration of particles (0.3 $\mu$m or larger) was measured continuously with a particle counter for 1 minute immediately after tearing. After repeating the above-described test 5 times, the concentration calculated by subtracting the background concentration from the maximum particle concentration among the data measured 5 times was referred to as the degree of dusting (expressed in particles per cubic feet).

(Pressure drop)

After setting a sample in a circular holder having an effective area of 100 cm², air was permeated through the sample at a face velocity regulated to 5.3 cm/sec with a flow meter. Then the pressure drop was measured with a manometer.

(Collection efficiency)

After setting a sample in the same holder as in the measurement of the pressure drop, air was permeated through the sample at a face velocity regulated to 5.3 cm/sec with a flow meter. Polydispersed dioctyl phthalate (DOP) of 0.1 to 0.2 $\mu$m in particle size was supplied as an aerosol to the upstream part Then the particle concentration in the upstream part and the at the rate to give a concentration of the particles in the downstream part penetrating through the sample were measured with a laser particle counter. The collection efficiency was determined in accordance with the following formula.

Collection efficiency (%)=(1 −$C_D$/$C_U$)×100.

In the above formula, $C_D$ means the particle concentration in the downstream part; and $C_U$ means the particle concentration in the upstream part.

EXAMPLE 1

100 Parts by weight of a fine PTFE powder (Fluon CD-123, manufactured by Asahi-ICI Fluoropolymers) was uniformly mixed with 30 parts by weight of a liquid lubricant (liquid paraffin). The resulting mixture was pre-molded at 20 kg/cm² and then paste-molded into a rod by extrusion. The molded article in the form of rod was passed between a pair of metal rolls to obtain a continuous sheet having a thickness of 0.2 mm. After removing the liquid lubricant from the molded article in the form of sheet by the extraction method using Trichlene, the sheet was wound up around a pipe. Then the sheet was stretched by rolling 20-fold in the lengthwise direction of the sheet at 320° C. Next, it was further stretched by tentering 30-fold in the width direction at 90° C., thereby obtaining a porous PTFE membrane. The obtained porous PTFE membrane was further heated to 390° C. for 5 seconds with fixing dimensionally. Thus, a desired porous PTFE membrane (thickness: 12 $\mu$m, average pore size: 1 $\mu$m, porosity: 91%) was obtained. When measured the above-described methods, this porous PTFE membrane showed a pressure drop of 15 mmH$_2$O and a collection efficiency of 99.993%. The PF value of this porous PTFE membrane was 27.7.

Next, 30 kg of an UHMWPE powder (molecular weight: 5,000,000, m.p.: 135° C., average particle size: 120 $\mu$m) was supplied into a cylindrical mold sealed at the bottom (bottom area: 1300 cm²) and heated to 130° C. under elevated pressure of 10 kg/cm², thereby adjusting the height of the powder packing to 55 cm (pre-molding). Subsequently, the powder was further heated to 160° C. under elevated pressure of 50 g/cm² for 12 hours and then cooled by allowing to stand at room temperature (about 25° C.) for 48 hours. After cooling, a porous molded article in the form of a block (diameter: about 40 cm, height: 54 cm) was taken out from the mold and cut with a lathe to give a thickness of 200 $\mu$m Thus, a desired porous UHMWPE membrane (porosity: 60%, average pore size: 35 $\mu$m) was obtained.

Figure 1:
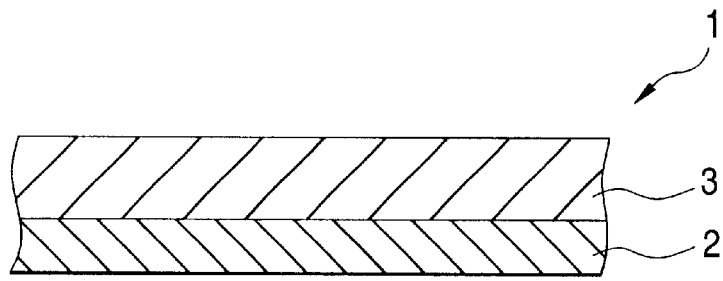
FIG. 1 is a sectional view showing an embodiment of the filter medium for filters according to the present invention.

The porous PTFE membrane and the porous UHMWPE membrane thus prepared were superposed on each other and laminated by the heat-pressure lamination method using a pair of rolls (roll temperature: 150° C.) to give a filter medium for filters having the same constitution as the filter medium shown in FIG. 1.

EXAMPLE 2

A filter medium for filters was obtained in the same manner as in Example 1 except for laminating a porous UHMWPE membrane and porous PTFE membranes to give the same constitution as the filter medium shown in FIG. 2 (i.e., the porous UHMWPE membrane being sandwiched between a pair of porous PTFE membranes).

EXAMPLE 3

A filter medium for filters was obtained in the same manner as in Example 1 except for laminating porous UHMWPE membranes and a porous PTFE membrane to give the same constitution as the filter medium shown in FIG. 3 (i.e., the porous PTFE membrane being sandwiched between a pair of porous UHMWPE membranes).

COMPARATIVE EXAMPLE 1

A filter medium for filter was obtained in the same manner as in Example 1 except for using, as a substitute for the porous UHMWPE membrane, a polyester/polyethylene core-shell type non-woven fabric (ELEVES, manufactured by Unitika, Ltd., basis weight: 40 g/m², thickness: 180 μm) and setting the roll temperature to 140° C.

COMPARATIVE EXAMPLE 2

A filter medium for filters was obtained in the same manner as in Example 1 except for using, as a substitute for the porous UHMWPE membrane, a non-woven polyester fabric (SYNTEX, manufactured by Mitsui Petrochemical Industries, Ltd., basis weight: 45 g/m², thickness: 200 μm) on one face of which a polyethylene powder (melting point: about 95° C.) had been applied at a rate of 10 g/m² and fused by heating to 120° C. and setting the roll temperature to 140° C.

COMPARATIVE EXAMPLE 3

A commercially available filter medium for filters made of glass fiber of the ULPA (Ultra Low Penetration Air) grade was used.

COMPARATIVE EXAMPLE 4

The porous PTFE membrane obtained in Example 1 was used alone as a filter medium for filters.

COMPARATIVE EXAMPLE 5

The porous UHMWPE membrane obtained in Example 1 was used alone as a filter medium for filters.

The filter media for filters obtained in the above Examples and Comparative Examples were subjected to the quantitative analysis on gas evolution by the method described above. Moreover, degrees of dusting, pressure drops and collection efficiencies thereof were determined.

The results obtained are shown in the Table below.

As the above Table clearly shows, the filter media for filter of the above Examples could reduce the concentrations of DOP, BHT and DBP each to less than 1 μg/g (1 ppm) in the quantitative analysis on gas evolution carried out by the above-described method. The BHT concentrations measured in these Examples including Example 1 were each regulated to a level 20% or less as much as the BHP concentrations in Comparative Examples 1 and 2 measured under the same conditions. Also, the concentrations of DOP, DBP and nitrogen compounds measured in these Examples including Example 1 were each comparable or lower than those in Comparative Examples 1 and 2.

As the Table also shows, the filter media for filters of the above Examples could reduce degree of dusting each to less than 500 particles/cf. The degrees of dusting measured in these Examples including Example 1 were each regulated to a level 20% or less as much as those in Comparative Examples 1 and 2.

Thus, filter media for filters having a collection efficiency of 99.99% or above could be obtained in these Examples. When the same porous PTFE membrane was employed but a porous UHMWPE membrane was used as a substitute for a nonwoven fabric as a reinforcing member, the degree of dusting could be lowered and the organic gas evolution could be depressed without substantially deteriorating the collection performance.

The filter medium for filters of Comparative Example 3 with the use of glass fiber was inferior in degree of dusting, etc. to those with the use of the porous PTFE membrane. Although the filter medium for filters of Comparative Example 4 with the use of the porous PTFE membrane alone was excellent in gas evolution, pressure drop and collection efficiency, it was easily broken in the test on degree of dusting, thus failing to achieve an adequate strength as a filter medium for filters. Although the filter medium for filters of Comparative Example 5 with the use of the porous UHMWPE membrane alone was excellent in gas evolution, degree of dusting, pressure drop and collection efficiency, it showed a low collection efficiency and thus was inappropriate for the desired filter medium for filters.

As described above, the present invention can provide a filter medium for filters, wherein a porous ultrahigh-molecular weight polyolefin membrane is used as a reinforcing member, capable of achieving a clean environment by taking advantage of the excellent characteristics inherent to a porous PTFE membrane as a collection layer.

What is claimed is:

1. A filter medium for filters, comprising a laminate comprising a porous ultrahigh-molecular weight polyethylene membrane and a porous polytetrafluoroethylene membrane, wherein ultrahigh-molecular weight polyethylene particles in said porous ultrahigh-molecular weight polyethylene membrane are bonded to each other so as to form a porous structure provided with voids among said particles.

2. The filter medium for filters as claimed in claim 1, which has a degree of dusting of 500 particles/cf or less in a tear crease-flex test.

3. The filter medium for filters as claimed in claim 1 or 2, which contains 2 μg/g or less of a compound selected from the group consisting of dioctyl phthalate, 2,6-di-tert-butyl-p-cresol and dibutyl phthalate when determined by gas chromatography.

TABLE

|  | Gas evolved (μg/g) | | | | Degree of dusting | Pressure | Collection |
| --- | --- | --- | --- | --- | --- | --- | --- |
|  | DOP | BHT | DBP | N compound | (particles/cf) | drop (mmH$_2$O) | efficiency (%) |
| Ex. 1 | <0.3 | 0.6 | <0.3 | <0.3 | 350 | 28 | 99.997 |
| Ex. 2 | <0.3 | 0.6 | <0.3 | <0.3 | 320 | 48 | 99.999999 |
| Ex. 3 | <0.3 | 0.7 | <0.3 | <0.3 | 390 | 29 | 99.999 |
| C. Ex. 1 | <0.3 | 23.0 | 2.3 | <0.3 | 2,056 | 24 | 99.995 |
| C. Ex. 2 | <0.3 | 4.2 | <0.3 | <0.3 | 2,793 | 26 | 99.997 |
| C. Ex. 3 | <0.3 | <0.3 | 86 | 162 | 5,860 | 51 | 99.998 |
| C. Ex. 4 | <0.3 | <0.3 | <0.3 | <0.3 | measurement impossible due to breakage | 15 | 99.993 |
| C.Ex. 5 | <0.3 | 0.6 | <0.3 | <0.3 | 330 | 7 | <50 |

* * * * *